Dec. 27, 1955 R. C. FERGASON 2,728,184
CENTER DIVIDER FOR A TRACTOR MOUNTED CORN HARVESTER
Original Filed June 15, 1942 5 Sheets-Sheet 3

Inventor
Rector C. Fergason
By Kenneth McKinney
Attorney

Dec. 27, 1955 R. C. FERGASON 2,728,184
CENTER DIVIDER FOR A TRACTOR MOUNTED CORN HARVESTER
Original Filed June 15, 1942 5 Sheets-Sheet 4
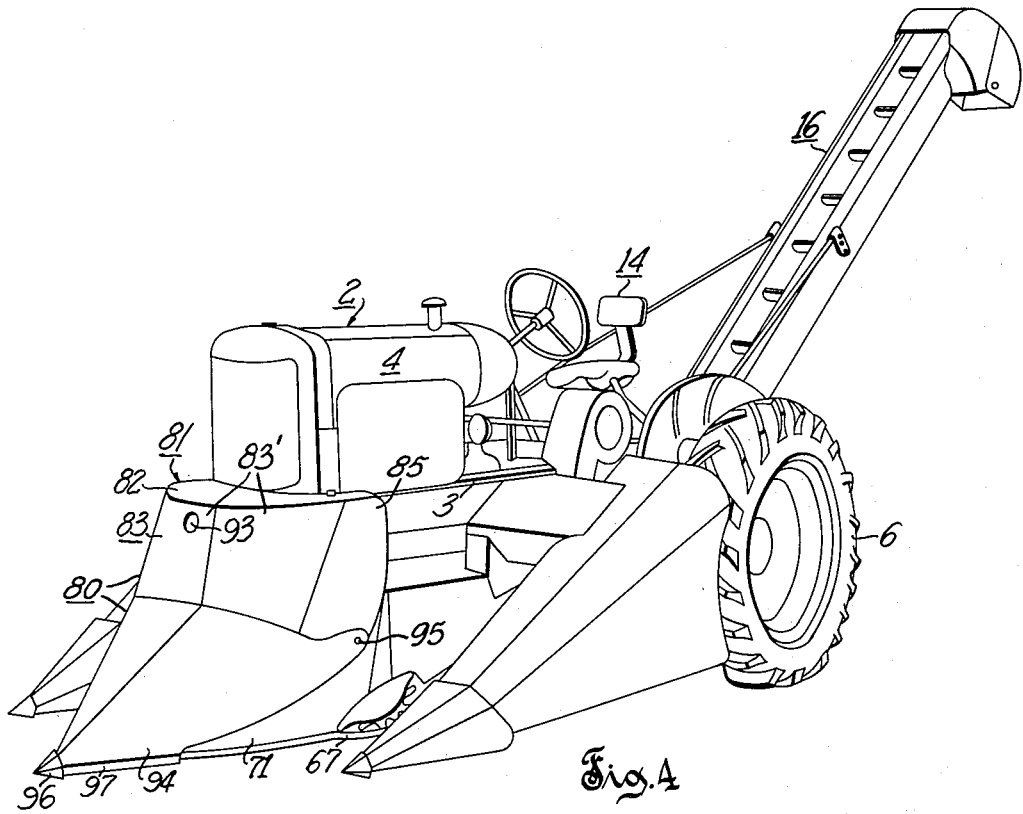
Fig. 4
Fig. 5
Fig. 6
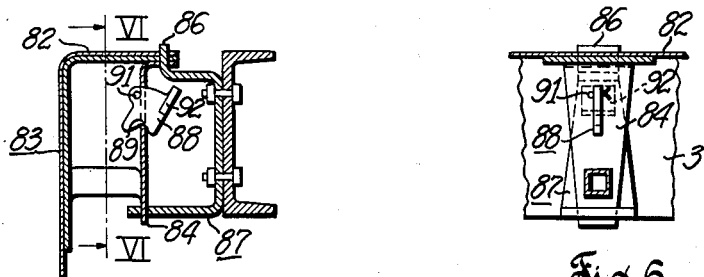
Inventor
Rector C. Fergason

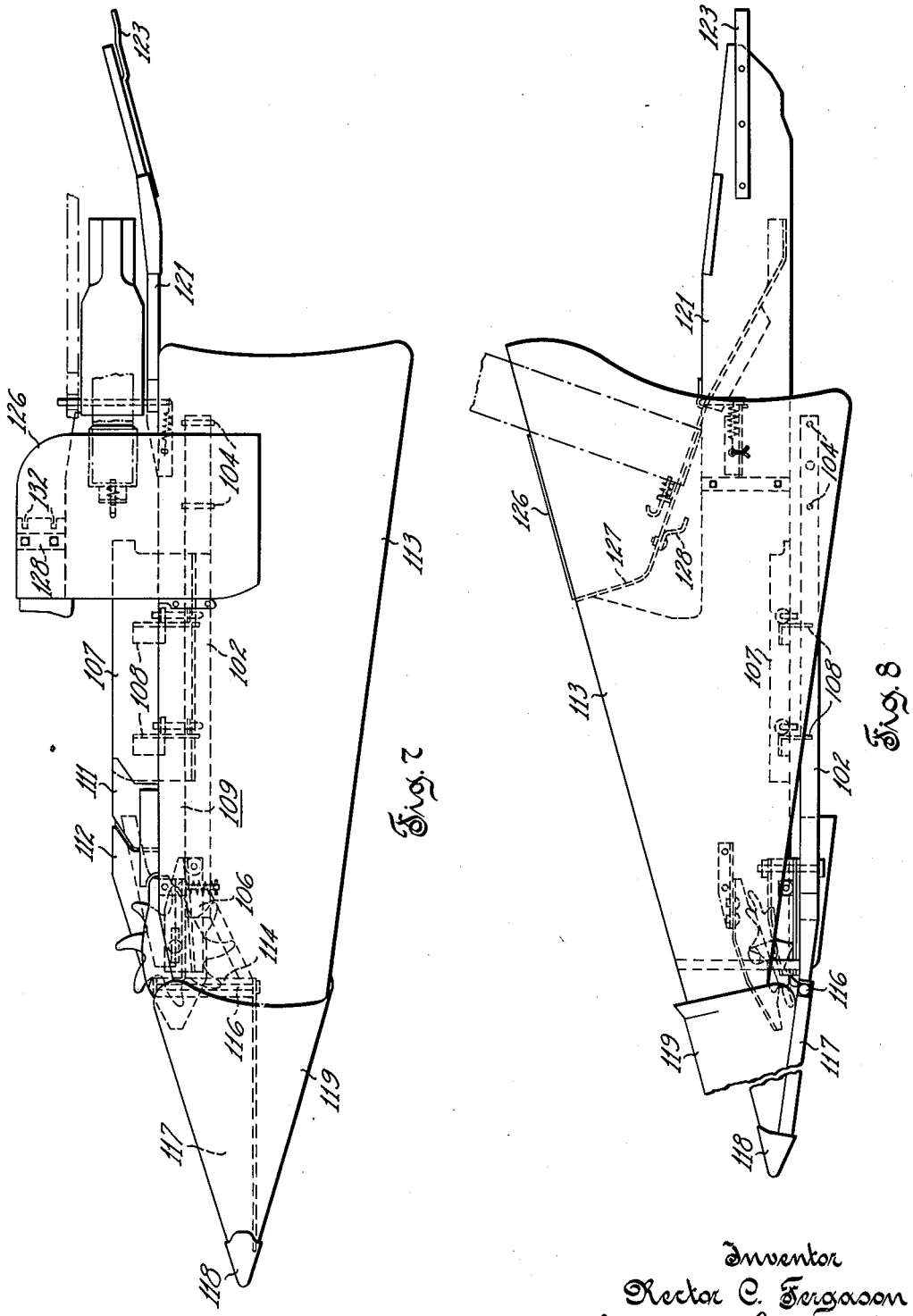

United States Patent Office 2,728,184
Patented Dec. 27, 1955

2,728,184

CENTER DIVIDER FOR A TRACTOR MOUNTED CORN HARVESTER

Rector C. Fergason, Gadsden, Ala., assignor to Allis-Chalmers Manufacturing Company, Milwaukee, Wis.

Division of application Serial No. 447,025, June 15, 1942. Continuation of application Serial No. 111,057, August 18, 1949, now Patent No. 2,663,983, dated December 29, 1953. This application May 13, 1953, Serial No. 354,692

4 Claims. (Cl. 56—119)

This application is a division of my copending application Serial No. 447,025, filed June 15, 1942, now abandoned, and the continuation thereof, application Serial No. 111,057, filed August 18, 1949, now U. S. Patent No. 2,663,983, issued December 29, 1953, and the invention relates in general to agricultural implements, and has more particular relation to corn harvesters wherein during their travel through the field, ears of corn are picked from standing stalks and the husks are preferably removed from the picked ears and the latter are conveyed to a suitable point of collection.

Tractor mounted corn harvesters have been in commercial production and use for a considerable time past, but commercial forms of such harvesters have heretofore been relatively cumbersome and heavy with a consequent requirement of relatively considerable time and labor in assembling the harvester on the tractor and removing it therefrom when it is desired to use the tractor for other farm purposes.

The present invention is directed toward and contemplates avoiding or minimizing the disadvantages of present commercial forms of such farm implements, and the production of a corn harvester of such simple design and construction, reduced number of parts and lightweight, as results in reduced initial cost to the farmer and reduced costs of operation, and embodies features which provide for efficient operation and increased comfort and safety of the operator, and which facilitates ready assembling of the harvester on the tractor and removal therefrom in a minimum of time.

Further advantages of this invention are concerned with the provision of improved design and construction for guiding the standing corn stalks into effective snapping relation with respect to the rolls, and for lifting down stalks and ears into position where they are effectively carried into desired operative relation with respect to the rolls.

Further advantages of this invention are concerned with the provision of an improved design of center divider and associated shields for a harvester of the two row type; and additional advantages of the invention are concerned with an improved design of readily removable and replaceable outer shield, and associated parts, for the gathering and picking mechanism of the harvester.

Objects of this invention are concerned with provision of a corn harvester and its mounting on a tractor, of such improved design and construction as contribute to the attainment of the aforesaid and other structural and operating advantages, individually and collectively.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 4 is a perspective view drawn to a reduced scale of the harvester mounted on the tractor;

Fig. 5 is an enlarged sectional view of a detail, in the plane of the line V—V of Fig. 1;

Fig. 6 is a sectional view, in the plane of the line VI—VI of Fig. 5;

Fig. 7 is an enlarged plan view of one of the removable outer gathering elements of the harvester;

Fig. 8 is an outer side view of the elements shown in Fig. 7;

Fig. 9 is an enlarged plan view of an element shown in Fig. 3; and

Fig. 10 is a sectional view in the plane of the line X—X of Fig. 9.

Figure 1:
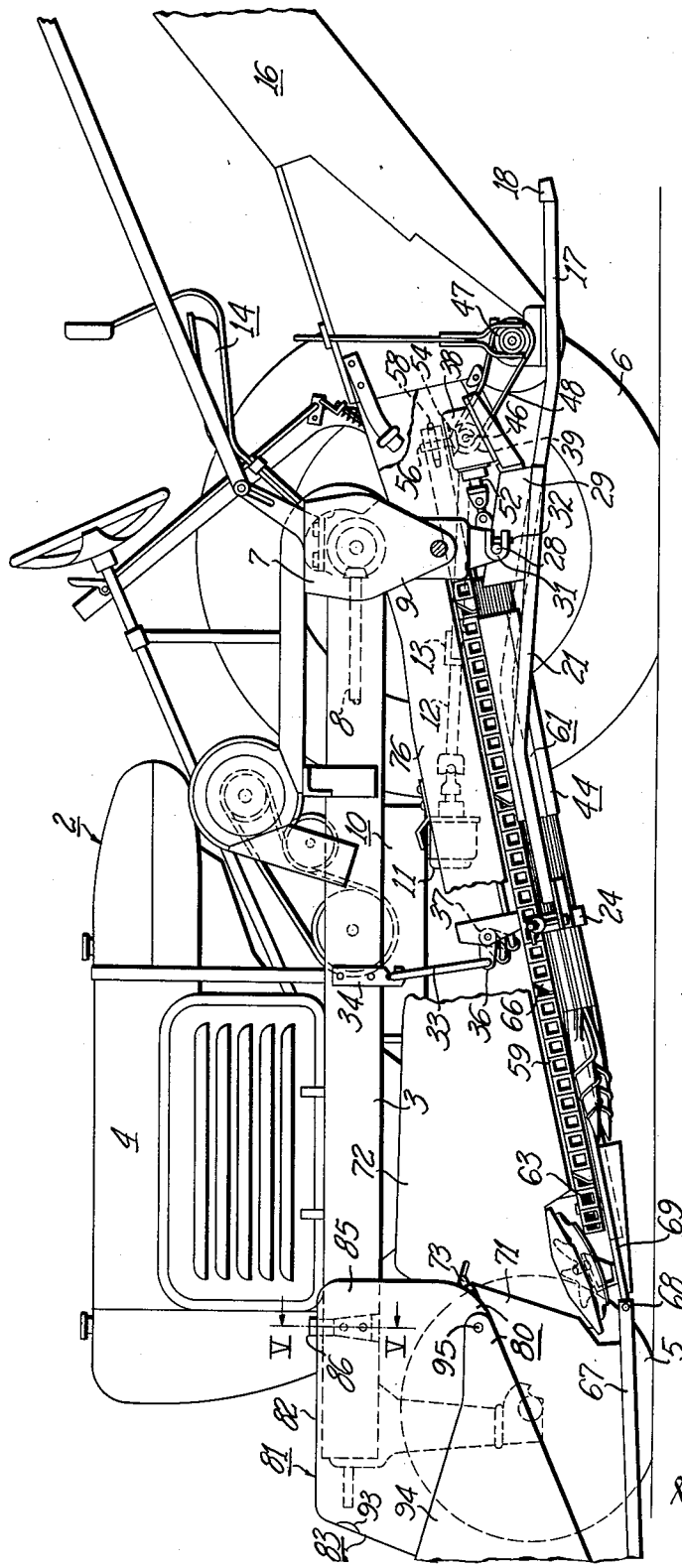
Fig. 1 is a view in side elevation, with parts removed to facilitate illustration, showing a tractor mounted corn harvester embodying features of the present invention.
Figure 2:
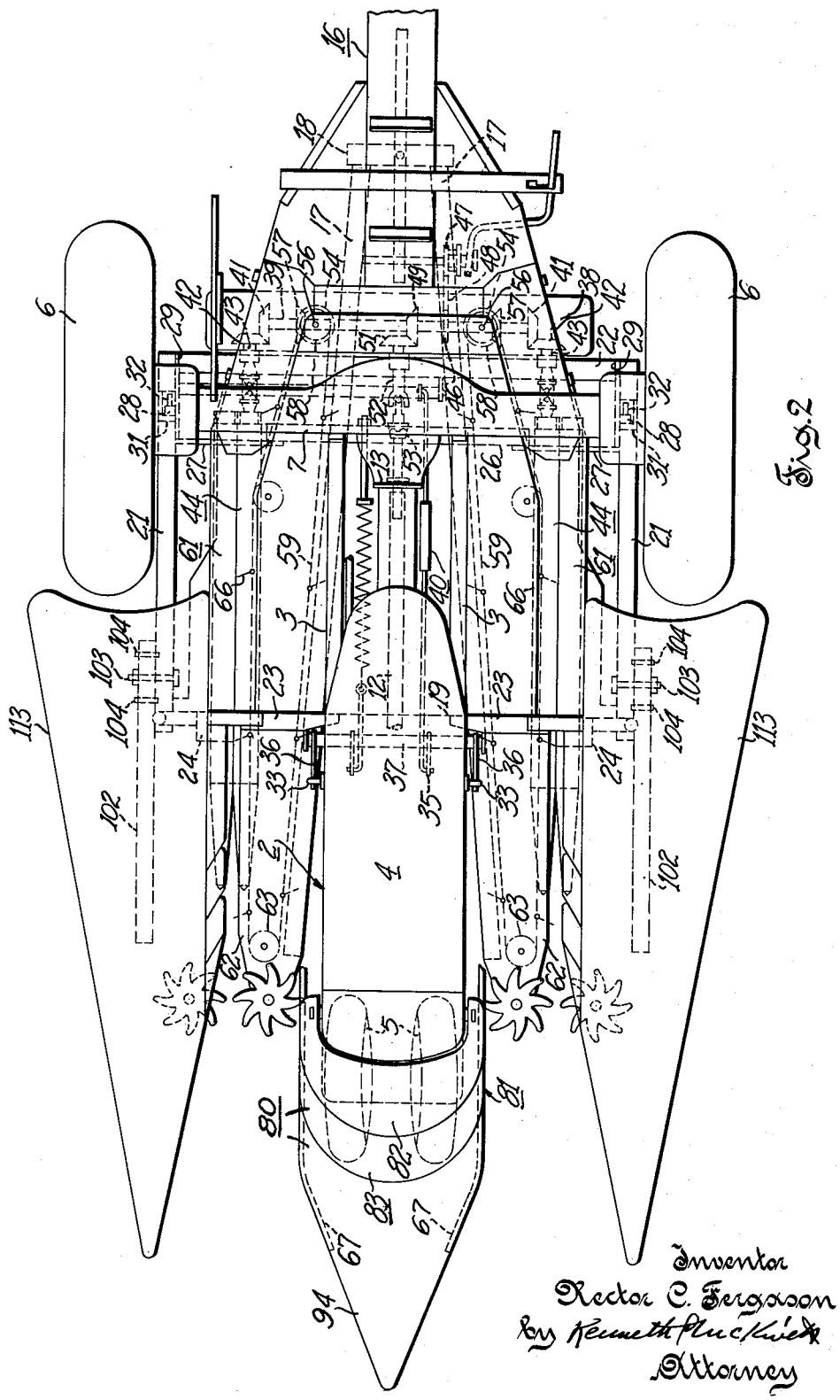
Fig. 2 is a plan view of the harvester, with parts removed, in its relation to the tractor.

In the embodiment of the invention illustrated in the drawings particularly in Figs. 1, 2 and 4, a conventional form of tractor, or other suitable form of mobile frame, is indicated at 2, and includes a supporting frame 3 carrying an engine 4, with conventional controls and other accessories. The tractor frame is supported on a pair of steerable front wheels 5 having their axles suitably hung from the frame, and on a pair of traction wheels 6 carried by a rear axle housing 7 supported on or integral with the rear portion of the tractor frame. This rear axle housing is preferably of the drop type wherein the central or intermediate portion encloses a differential drive, driven from the usual transmission shaft 8, and depending side portions 9 of the housing enclosing gear connections from the differential drive to the axles of the traction wheels 6. A conventional change speed transmission 10 provides a variable speed connection from the engine shaft to the transmission shaft 8; and a power take-off connection 11, preferably associated with the transmission 10, serves to drive a power take-off shaft 12 having an internally splined sleeve 13 at its rear end for furnishing power to the various parts of an implement that may be associated with the tractor. An operator's seat 14 is suitably supported on the engine frame or rear axle housing in desired position with respect to the tractor controls.

The corn harvester is shown as comprising two units which are similar except as to being left and right, respectively, and each comprising cooperative picking and husking rolls mounted on a supporting frame and disposed at its own side of the tractor frame and with its essential harvesting parts disposed laterally within the tread of the adjacent traction wheel 6, and a conveying device extending rearwardly for conveying husked corn beneath the tractor rear axle housing and depositing it in the forward lower end of an elevating conveyer 16 at the rear of the tractor, along with suitable controls and drives for operating the several mechanisms of the harvester.

Figure 3:
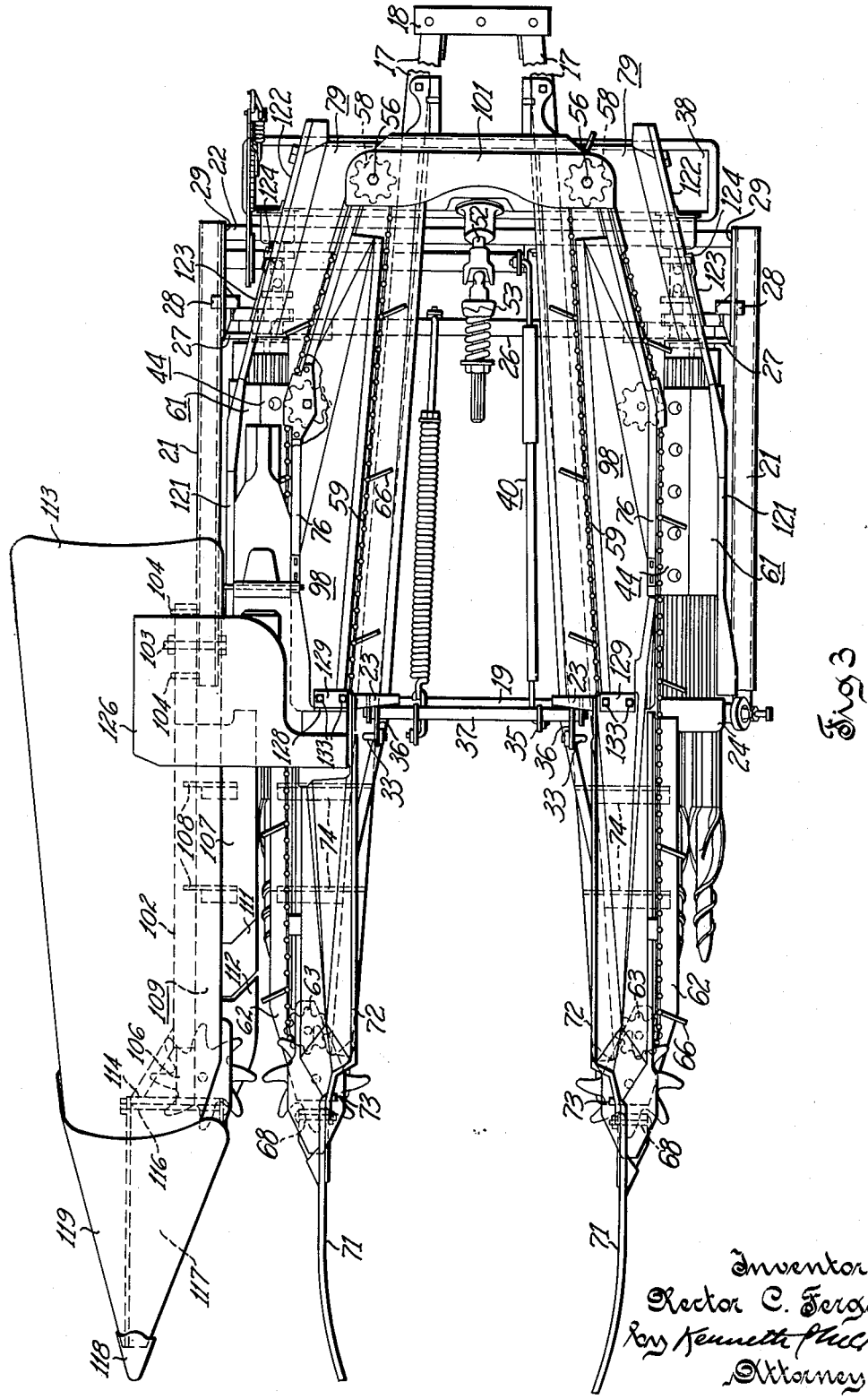
Fig. 3 is a plan view of the harvester, with parts removed.

As more particularly shown in Figs. 2 and 3, the harvester frame comprises two longitudinally extending frame bars 17 connected in laterally spaced relation through a cross bar 18 at their rear end; and a cross bar 19 rigidly connected to the bars 17 at a forward point. Longitudinally extending frame bars 21, preferably of rectangular tubular form, are disposed laterally outside of the bars 17 and are connected to frame bars 17 either directly or by brackets by a cross member 22 connected to rear ends of the bars 21. The bars 21 are also connected to the adjacent longitudinal frame bars 17 through brackets 23 rigidly connected to the bars 17 and bearing supports 24 detachably connected to the brackets 23 and to the forward end portion or an extension thereof, of the corresponding bars 21. A cross bar 26 is also rigidly connected, through connecting brackets, to the longitudinal bars 17, and upstanding bracket members 27 serve to connect the lateral extensions of the cross bar 26 to the bars 21. These bracket members 27 serve as supports for the rear bearings of the harvester rolls, to be referred to hereinafter.

The harvester frame is pivotally mounted on the tractor through horizontally-aligned pivot pins 28 carried by the frame, preferably mounted on bracket plates 29 (see Fig. 1) mounted on the rear portions of the frame bars 21, with the pivot element extending through and outwardly from the plate and welded thereto and braced thereon. The pins 28 are received in bearing recesses of bracket bearing members 31 which are open at their rear ends, the pivot pins being held in operative position in their bearing brackets 31 by removable locking pins 32. The bearing brackets are attached to depending side portions 9 of the rear axle housing 7. The laterally projecting pivot pins 28 are in such position with respect to the other portions of the harvester frame that the tractor may be propelled rearwardly over the harvester frame and parts carried thereby when the frame is supported on the ground, with its rear end at a suitable elevation, until the rear end of the bearing brackets 31 pass over and receive the pivot pins therein.

The forward end of the harvester frame is hung from the tractor at an adjustable height above the ground through a pair of hanger rods 33 removably suspended from brackets 34 attached to each side of the tractor frame. The lower end of each of the hangers 33 is removably attached to arms 36 mounted on a sleeve 37 pivotally mounted in brackets carried by frame members 17. An arm 35 (see Fig. 3) attached to sleeve 37 is connected to a mechanism 40 actuable by the tractor operator for raising and lowering the front end of the corn harvester.

An enclosing housing 38 of a power transmitting drive is removably mounted on a pair of brackets carried by cross-bar 22 (see Fig. 2). A cross shaft 39 is journaled and enclosed in housing 38 and has bevel gears 41 attached to the ends thereof. The gears 41 mesh with bevel gears 42 carried by the rear ends of forwardly extending shafts 43 mounted in bearings carried by housing 38. These shafts are preferably connected through flexible coupling in the form of a double universal coupling with the rear ends of harvesting rolls 44.

Shaft 39 has a sprocket wheel 46 attached to a midportion thereof which is drivingly connected to sprocket 47 of ear elevator 16 by means of a chain 48. A bevel gear 49 attached to shaft 39 meshes with a bevel gear 51 on the inner or rear end of shaft section 52 extending forwardly and mounted within a bearing carried by housing 38. The forward end of this shaft is provided with a suitable coupling 53 adapted at its forward end to be received within splined sleeve 13 of power take-off shaft 12. A bevel gear 54 is secured to the lower end of each shaft 56 within housing 38 and in driven relation to bevel gears 57 secured to shaft 39. Attached to the upper end of each shaft 56 indirectly through an overload clutch mechanism (not shown) is a sprocket 58 drivingly connected to a conveyor chain 59.

With the parts of the power transmission drive in assembled relation and the shaft 52 connected to the power take-off shaft 12 of the tractor engine, the shaft 39 is driven through bevel gears 49, 51. The shaft 39 acting through bevel gears 41, 42 drives the forwardly extending shaft 43 and the parts associated therewith, through bevel gear connections 54, 57 drives the upwardly extending shafts 56 and the parts associated therewith, and through sprocket 46 and chain 48 drives elevating conveyer 16.

Each picker husker unit, shown more particularly in Fig. 3 comprises a pair of oppositely rotatable cooperative rolls, the outer roll being indicated generally at 61 and the inner roll at 44. These rolls are rotatably supported in operative position through journal portions on the roll shafts thereof at their rear end in bearings carried in bearing supporting plate 27 and at an intermediate point in bearings mounted in bearing support 24 adjacent the forward end of the longitudinal bars 21. The axis of the outer roll is substantially higher than the axis of the inner roll as is indicated in Fig. 1. Rear portions of rolls 44 and 61 are provided with mating gears so that roll 61 is driven by roll 44 with the opposed sides of the rolls moving downwardly.

Attached to each longitudinal frame bar 17 in overlying relation thereto is a plate 62 projecting outwardly from the bar toward and overlying the adjacent harvester roll 44 to act as a stripper plate. A sprocket 63 is rotatably mounted on a forward end of plate 62 and a conveying chain 59 driven by sprocket 58 passes around sprocket 63 which forms the forward end of such conveyer. Chain 59 is provided with flights 66 which are adapted to move standing stalks of corn in between rolls 44 and 61 and to move rearwardly ears of corn which have been snapped from the stalks.

Forwardly extending frame bars 67 are pivotally mounted about a horizontal axis on a pivot carried by a bearing 68 at the front end of the forward extension 69 of the frame bars 17; and the forward portion of these bars gradually curve inwardly. Upstanding side shield elements 71 of gradually reduced height toward their forward end are secured to the bars 67, and the bars 67 extend beyond the forward end of the shields 71; and the rear end of these shields fits outside the forward end of inner gathering shields 72, the pivotal movement of the bars 67 and shield elements 71 carried thereby being limited through engagement of inwardly extending bolts 73 at the upper rear end of the shields 71 passing through elongated slots in the forward end of each gathering shield 72.

Each gathering shield 72 is mounted in position alongside the active course of chain 59 passing over the harvesting rolls and in spaced elevated relation to such chain as is indicated in Fig. 1. Shield 72 is indirectly supported from frame members 17 by transversely extending brace members 74 (see Fig. 3). The lower substantially vertical side wall of the shield 72 preferably has a rearward extension 76, the rear end being inclined inwardly, and this vertical wall being secured to the upper face of the chain guides 77, 78 (see Figs. 9 and 10), preferably by the same bolts as are used to secure the chain guides in position on the trough plate 79.

Mounted on the front end of the tractor frame is the upper section 81 of a center divider shield 80 (see Figs. 1 and 4), this section comprising a forwardly extending roof section 82 and a downward projection 83 therefrom having an inclined and generally curved front or forward wall 83 with side portions 85 extending alongside and spaced from the front end of the tractor frame. This upper section is detachably secured in position by means of brackets 84 (see Figs. 5 and 6) secured to the inner side of the roof and side wall portions, the upper portion of these brackets and the roof section having apertures therethrough which fit over the turned up end 86 of the upper flange of brackets 87 removably attached to the side frame 3 of the tractor. The lower end of each bracket 84 has a guiding fit in an aperture in a lower flange of the bracket 87. In this condition, the weight of the upper section is carried by the upper flange of bracket 87. The divider section 81 is releasably held in operative position by latches 88 inserted through slots in an inner plate portion of the brackets 84, the lower edge of the latch having a recessed portion with a rounded upper side, as indicated at 89, which fits over the edge of the lower wall of a slot in the plate portion of the bracket 84, this edge serving as a pivot on which the latch may rotate. After the latch is inserted in the slot in the bracket 84 from the inner side thereof, a cotter pin 91, passed through an aperture in the outer edge portion of the latch, engages the side walls of the slot in bracket 84 to restrain inward movement of the latch about its pivot.

A weighted extension 92 near the upper edge of the inner side of the latch biases the latch to a position wherein this extension lies immediately below the upper flange of the bracket 87, thus restraining the divider section 81 against upward removal from the tractor. To remove the upper divider section, the operator reaches from underneath and rotates the latch 88 outwardly on its pivot so that the extension 92 clears the upper flange of the bracket 87; and then the upper section may be moved upwardly to withdraw the bracket 84 from the turned up end of the upper flange on the bracket 87 and to withdraw the lower end of the bracket 84 from the aperture in the lower arm of the bracket 87, thereby permitting complete withdrawal of divider section from the tractor.

The curved forward wall portion 83' of the upper divider section 81 is provided at a forward central point with an aperture 93 through which a crank may be inserted for starting the tractor engine. With this crank aperture in a fixed portion of the center divider, the position of vertical adjustment of harvester frame or other parts does not interfere with cranking the engine.

A lower center divider section 94 has its upper edge of generally rounded form, fitting over the correspondingly shaped lower portion 83 of the upper section 81 of the center divider and has rearwardly extending side portions through which this lower section is pivotally mounted in a detachable manner to a lower rear portion of the upper section of the divider, preferably through a removable pivot bolt 95 passing through suitably stiffened portions of the side walls of the two sections. A pointed traveling shoe 96 is mounted on lower divider section 94 at its forward end; and the lower edge of this section is provided with reinforced side strips each provided with a bail or loop 97 into which the forward ends of the pivoted arms 67 on the side shields 71 project with a loose guided fit, thus assisting in bracing the lower edge portion of this center divider section 94, while at the same time permitting pivotal movement of this divider section and the shield 71 about pivot members 95 and 68, respectively, and insuring that the lower divider section may follow the raising and lowering of the forward end of the harvester frame to which the shields 71 are pivotally attached.

An inner rear shield section 98 (see Fig. 3) is secured in position by bolts, preferably the same bolts as hold the chain guide 99 (Figs. 9 and 10) in position, passing through a flange at the inner edge of the shield section and into or through this chain guide. The upwardly and outwardly rising wall at the forward portion of the shield is secured by bolts to an upper flange on the rearwardly extending guide wall section 76 of the shield 72; and the rear portion of the shield 98 of gradually reducing height has a vertical flange at its upper edge in engagement with the inner side of the rear portion of the guide wall extension 76.

A rear end shield or guard 101 overlying the upwardly extending driving shafts 56 of the main power drive on which the sprockets 58 are mounted, has forwardly extending side walls inside which the rear ends of the rear extensions 76 of the shield 72 fit and which are preferably bolted to such extensions.

A separate forwardly extending frame bar 102 is detachably secured by one or more bolts 103 and positioning pins 104 to the outer side of the forward end of each frame bar 21, this bar 102 extending forwardly in substantially the same plane as the bar 21 and the adjacent portion of the frame bar 17; and an extension 106 is secured to the bar 102 at its forward end.

A transversely adjustable rear stripper plate 107 inclined downwardly so that its inner edge lies over and adjacent harvester roll 61, is mounted on upper flange portions of brackets 108 secured to the frame bar 102. Forwardly of stripper plate 107 a stripper plate 109 is mounted on bar 102 and is provided with a pair of leaves 111 and 112 pivotally mounted on the inner edge thereof. In operation the stripper leaves may be rotated on their pivot, so as to raise the inner edge of the leaves, by a low hanging ear or a heavy stalk beneath the leaves; to permit an ear to pass upwardly of the inner edge of the leaves, thus insuring that the corn ear and the portion of the stalk to which it is attached are brought to the upper side of the stripper plates into a position where the ear may be subjected to the normal action of the harvesting rolls.

An outer gathering shield 113 is attached in position through a flange at the inner lower edge thereof, to the stripper plate 107 through the bolts which mount the stripper plate on the bar 102, the shield extending upwardly and curving outwardly to a substantially vertical outer side wall portion, generally as indicated in Figs. 7 and 8. The upper portion of this gathering shield may be braced in position by one or more bracing rods secured thereto and to the outer edge of the stripper plate 107, and the lower outer edge of the gathering shield may be suitably stiffened and held in position by one or more braces or plates detachably secured to such lower edge portion and to the outer edge of the stripper plate.

A supporting hub or sleeve 114 is mounted on the forward end of the extension 106 of the frame bar 102 and a bracket secured to the bar 102. A rod 116 is pivotally mounted in the hub 114 and carries a forwardly extending channel-like frame 117 of gradually tapering width toward its forward end; and a traveling shoe point 118 is mounted on the forward end of the channel frame 117. A shield 119 of tapering width and generally semi-circular cross section is mounted on shoe 118 and the inner edge of the channel frame 117. This gathering shield may be suitably stiffened along its lower outer edge. The shield 119 may rise and fall to a limited extent about the pivot rod 116, with the rear end of the shield riding over and along the forward end portion of the shield 113, the upward movement of the shield 119 being limited by a binding engagement between the rear end of such shield and the adjacent portion of the gathering shield 113.

A rearwardly extending substantially vertical guide plate or wall 121 is attached to the lower rear part of the inner side wall of the gathering shield 113, this guide wall extending rearwardly, with its rear end bent inwardly, to the forward edge of the outer guide wall 122 of the trough plate 79 (see Fig. 3), and an extension or rod 123 fits into a bail or slotted part 124 carried at the outer side of the wall 122. With this arrangement the rear end of the guide wall 121 is definitely positioned with respect to the trough plate and forms, in conjunction with the wall 122 the outer side of a conveyer trough through which the active course of the chain 59 passes, the inner wall of this conveyer trough being formed by the rear extension 76 of the inner gathering shield 72.

A transversely extending hollow bracket portion 126 is secured to and supported by the upper portion of the inner side wall of the gathering shield 113 and is provided with a depending forward wall 127, this bracket portion forming a bracing connection between the outer shield 113 and the adjacent portion of the inside gathering shield 72. The inner edge of the bracing bracket portion 126 is provided with a securing bracket or extension 128 at its underside fitting beneath a securing clip 129 attached to the vertical bracket plate 23 mounted on chain guides 77 and 99, the bracket 128 having rearwardly opening slots 132 which fit about the shank portions of bolts 133 passing through the clip 129. Securing nuts are drawn up tight against the clip 129 to secure the inner edge of the transverse bracket portion 126 of the outer gathering shield 113 in position.

When it is desired to remove the harvester from the tractor, the pivot bolts 95 attaching the lower center divider shield section 94 to the upper section 81 of such divider are removed, and then the lower section of this divider can be moved forwardly from the upper section and from the forwardly extending bars 67 pivoted to the frame bars 17. The upper section of the center divider can then be removed forwardly after releasing the securing latch 88. The outer gathering shield assembly may then be removed on loosening the bolts 133, passing through the rearwardly opening slots of a bracket portion on the inner part of the bracing extension 128 of the outer gathering shield, and the bolts 103 connecting the frame bars 102 to the frame bars 21 are removed. In this condition, the outer gathering shield assembly is drawn forwardly to release the rear extension bar at the rear end of the extension wall 121 on the gathering shield from the bail on the outer wall 122 of the trough plate 79. The outer gathering shields and associated parts can then be fully removed from the other portions of the harvester, so as to permit forward travel of the tractor.

As the detailed recitation of the method of removing the remaining structure of the harvester from the tractor forms no part of this invention, such recitation will not be here given as such can be found in the aforementioned parent application Serial No. 111,057.

To replace the shields on the harvester, the steps recited above are carried out in reverse and consequently are not here repeated.

It should be understood that this invention is not limited to the particular details of construction and design shown and described herein and that the invention includes such other applications and modifications as are fairly included within the scope of the annexed claims.

It is claimed and desired to secure by Letters Patent:

1. In combination, a mobile frame having a rear axle support mounting a pair of laterally spaced traction wheels, and having a forward portion of reduced width provided with a front wheeled support, a corn harvester comprising a supporting frame mounted on said mobile frame and carrying forwardly extending harvester rolls at the side of said mobile frame alongside said portion of reduced width, a shield comprising an upper section detachably mounted in relatively fixed position on the forward end of said mobile frame and having front and side wall portions enclosing the front and adjoining opposite side portions of said wheeled support, and a lower shield section overlapping the lower portion of said upper section and pivoted thereto to permit the forward end of said lower section to ride up and down relative to said upper section.

2. In combination, a mobile frame having a rear axle support for a pair of laterally spaced traction wheels, and having a forward portion of reduced width provided with a front wheeled support, a corn harvester comprising a supporting frame adjustably mounted on said mobile frame for relative up and down movement thereon and carrying forwardly extending harvester rolls at the side of the mobile frame alongside said portion of reduced width, a shield comprising an upper section detachably mounted in relatively fixed position on the forward end of said mobile frame and having front and side wall portions enclosing the front and opposite sides of said wheeled support, a lower shield section overlapping the lower portion of said upper section and pivoted thereto to permit the forward end of said lower section to ride up and down relative to said upper section; and a forwardly extending side shield pivotally mounted on a forward portion of said supporting frame at the inner side of the adjacent harvester roll, said side shield having a forward extension loosely engaging a forward portion of said lower shield section and affording a tilting movement of said lower shield section relative to said side shield.

3. In combination, a mobile frame having a rear axle support mounting a pair of laterally spaced traction wheels, and having a forward portion of reduced width provided with a front wheeled support, a two-row corn harvester comprising a supporting frame mounted on said mobile frame and carrying forwardly extending harvester rolls disposed along opposite sides of said forward portion of reduced width, a center divider shield comprising an upper section detachably mounted in relatively fixed position on the forward end of said mobile frame and having front and side wall portions enclosing the front and adjoining opposite side portions of said wheeled support, said upper section being provided at its forward side with an aperture to permit insertion of an engine crank, and a lower center divider section having front and side wall portions overlapping the lower portion of said upper section and pivoted thereto to permit the forward end of said lower section to ride up and down relative to said upper section.

4. In combination, a mobile frame having a rear axle support mounting a pair of laterally spaced traction wheels, and having a forward portion of reduced width provided with a front wheeled support, a two-row corn harvester comprising a supporting frame pivotally mounted on said mobile frame and carrying forwardly extending harvester rolls disposed along opposite sides of said forward portion of reduced width, a center divider shield comprising an upper section detachably mounted in relatively fixed position on the forward end of said mobile frame and having front and side wall portions enclosing the front and adjoining opposite side portions of said wheeled support, a lower center divider shield section having front and side wall portions overlapping the lower portion of said upper section and pivoted thereto to permit the forward end of said lower section to ride up and down along said upper section, and a forwardly extending side shield pivotally mounted on a forward portion of said supporting frame at the inner side of the adjacent harvester roll, said side shield having a forward extension loosely engaging a forward portion of said lower shield section and affording a tilting movement of said lower shield section in response to a tilting movement of said side shield.

References Cited in the file of this patent

UNITED STATES PATENTS

| | | |
|---|---|---|
| Re. 23,083 | Andrews et al. | Feb. 8, 1949 |
| 1,852,702 | Coultas et al. | Apr. 5, 1932 |
| 2,004,720 | Coultas et al. | June 11, 1935 |
| 2,011,925 | Benjamin | Aug. 20, 1935 |
| 2,259,893 | Hyman | Oct. 21, 1941 |
| 2,284,909 | Kuhlman | June 2, 1942 |